DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 10

T939,013

HOT MELT REWETTABLE ADHESIVE COMPOSITIONS

John R. Caldwell, 404 Colonial Heights Road, and John M. McIntire, 4409 Green Spring Circle, both of Kingsport, Tenn. 37663

Filed May 23, 7974, Ser. No. 472,776

Int. Cl. C08k *5/20;* C09j *3/14, 5/06*

U.S. Cl. 260—32.6 N

No Drawing. 10 Pages Specification

Adhesive compositions capable of being applied to a substrate in molten form and activated by the application of water are prepared from a mixture of low molecular weight poly(N-alkylacrylamide) and an amide of an aliphatic monocarboxylic or dicarboxylic acid, said amide containing from 2 to 6 carbon atoms per amido nitrogen atom.